(12) United States Patent
Dueckershoff et al.

(10) Patent No.: US 8,801,366 B2
(45) Date of Patent: Aug. 12, 2014

(54) STATOR BLADE FOR A GAS TURBINE AND GAS TURBINE HAVING SAME

(75) Inventors: Roland Dueckershoff, Hohr-Grenzhausen (DE); Shailendra Naik, Gebenstorf (CH); Martin Schnieder, Ennetbaden (CH)

(73) Assignee: Alstom Technology Ltd., Baden (CH)

(*) Notice: Subject to any disclaimer, the term of this patent is extended or adjusted under 35 U.S.C. 154(b) by 0 days.

(21) Appl. No.: 12/892,423

(22) Filed: Sep. 28, 2010

(65) Prior Publication Data

US 2011/0103932 A1   May 5, 2011

Related U.S. Application Data

(63) Continuation of application No. PCT/EP2009/052897, filed on Mar. 12, 2009.

(30) Foreign Application Priority Data

Mar. 28, 2008   (CH) .................................... 469/08

(51) Int. Cl.
   *F01D 9/02*   (2006.01)
   *F01D 9/04*   (2006.01)
   *F01D 5/18*   (2006.01)

(52) U.S. Cl.
   CPC ........ *F01D 5/187* (2013.01); *F05D 2220/3215* (2013.01); *F05D 2250/185* (2013.01); *F01D 9/041* (2013.01); *Y02T 50/676* (2013.01); *F05D 2260/22141* (2013.01); *F05D 2260/2212* (2013.01)
   USPC ...................................................... 415/115

(58) Field of Classification Search
   USPC ................................................ 415/115, 116
   See application file for complete search history.

(56) References Cited

U.S. PATENT DOCUMENTS 4,236,870 A  *  12/1980  Hucul et al. ................. 416/97 R
4,932,861 A       6/1990  Keller et al.
(Continued)

FOREIGN PATENT DOCUMENTS

| EP | 0321809 A1 | 6/1989 |
|---|---|---|
| EP | 0620362 A1 | 10/1994 |
| EP | 0704657 A2 | 4/1996 |
| EP | 1010859 A2 | 6/2000 |
| EP | 1223308 A2 | 7/2002 |
| EP | 1431514 A2 | 6/2004 |
| EP | 1469163 A2 | 10/2004 |
| EP | 1715139 A2 | 10/2006 |
| EP | 1849961 A2 | 10/2007 |
| JP | 2000199404 A2 | 7/2000 |
| JP | 2004197740 A2 | 7/2004 |
| WO | 9514848 A1 | 6/1995 |
| WO | 2005095761 A1 | 10/2005 |

OTHER PUBLICATIONS

Joos et al. "Field Experience With the Sequential Combustion System of the GT24/GT26 Gas Turbine Family" ABB Review, May 1998 pp. 12-20 (1998).

*Primary Examiner* — Edward Look
*Assistant Examiner* — Sean J Younger
(74) *Attorney, Agent, or Firm* — Buchanan Ingersoll & Rooney PC

(57) ABSTRACT

A stator blade for a gas turbine with sequential combustion, has a blade airfoil which extends in the radial direction between a blade tip and a shroud, with cooling passages extending inside the blade airfoil, through which a cooling medium can flow for cooling the blade and can then discharge from the stator blade into the hot gas flow flowing through the turbine. The blade airfoil has a sharply curved shape in space in the radial direction, and three cooling passages, which extend in the radial direction, arranged inside the blade airfoil in series in the hot gas flow direction and are interconnected by deflection regions, which are arranged at ends of the blade airfoil, so that the cooling medium flows through the cooling passages one after the other, with change of direction. The cooling passages follow the curvature of the blade airfoil in space in the radial direction.

15 Claims, 4 Drawing Sheets

(56) References Cited

U.S. PATENT DOCUMENTS

| | | |
|---|---|---|
| 5,454,220 A | 10/1995 | Althaus et al. |
| 5,488,825 A * | 2/1996 | Davis et al. ............ 60/806 |
| 5,511,309 A * | 4/1996 | Beabout ............ 29/889.72 |
| 5,588,826 A | 12/1996 | Dobbeling et al. |
| 5,669,759 A * | 9/1997 | Beabout ............ 416/97 R |
| 5,688,104 A * | 11/1997 | Beabout ............ 415/115 |
| 6,183,194 B1 | 2/2001 | Cunha et al. |
| 6,186,741 B1 * | 2/2001 | Webb et al. ............ 416/96 R |
| 6,416,275 B1 * | 7/2002 | Itzel et al. ............ 415/116 |
| 6,422,819 B1 * | 7/2002 | Tsai et al. ............ 416/97 R |
| 6,561,757 B2 * | 5/2003 | Burdgick et al. ............ 415/115 |
| 6,933,459 B2 * | 8/2005 | Helder et al. ............ 219/117.1 |
| 2002/0176776 A1 | 11/2002 | Parneix et al. |
| 2005/0281674 A1 | 12/2005 | Liang |
| 2007/0041836 A1 | 2/2007 | Tschuor et al. |
| 2007/0154312 A1 | 7/2007 | Neuhoff et al. |

* cited by examiner

STATOR BLADE FOR A GAS TURBINE AND GAS TURBINE HAVING SAME

CROSS REFERENCE TO RELATED APPLICATION

This application is a continuation of International Application No. PCT/EP2009/052897 filed Mar. 12, 2009, which claims priority to Swiss Patent Application No. 00469/08, filed Mar. 28, 2008 the entire contents of all of which are incorporated by reference as if fully set forth.

FIELD OF INVENTION

The present invention relates to the field of gas turbines. It refers to a stator blade for a gas turbine.

BACKGROUND

Large stationary gas turbines with sequential combustion have been proven in industrial application. In these gas turbines, two combustion chambers are arranged in series in the flow direction, and each with an associated turbine which are exposed to admission of the hot gas which is produced in the respective combustion chamber. Gas turbines of this type, which for example are offered by the Assignee of the present invention under the type designation GT24/26, are described for example in the printed publication by Joos F. et al., "Field experience with the sequential combustion system of the GT24/26 gas turbine family", ABB Review 5/1998, p. 12-20 (1998). FIG. 1 of which is reproduced in the present application as FIG. 1. A further description of such a gas turbine originates furthermore from EP-B1-0 620 362.

FIG. 1 shows a gas turbine 10 with sequential combustion, in which a compressor 11, a first combustion chamber 14, a high-pressure turbine 15, a second combustion chamber 17 and a low-pressure turbine 18 are arranged in series along an axis 19. In summary, these gas turbines can be described as follows: The compressor 11 and the two turbines 15 (HD), 18 (ND) are part of a rotor which rotates around the axis 19. The compressor 11 compresses the inducted air, wherein this compressed air then flows into a plenum and from there flows into the first combustion chamber. This combustion chamber is operated with premix burners, as originate for example from EP-A1-0 321 809, and furthermore from EP-A2-0 704 657. The compressed air flows into the premix burners where-intermixing with at least one fuel takes place. This fuel/air mixture then flows into the first combustion chamber 14, in which this mixture combusts, forming a stable flame front. The hot gas which thus results is partially expanded in the adjoining high-pressure turbine 15, performing work, and after that flows into the second combustion chamber 17 where a further fuel feed 16 takes place. As a result of the high temperatures, which the hot gas which is partially expanded in the high-pressure turbine 15 always has, combustion takes place in the second combustion chamber 17, which is based on spontaneous ignition. The hot gas which is reheated in the second combustion chamber 17 is then expanded in a multi-stage low-pressure turbine 18, in which blade rows of rotor blades and stator blades are arranged in series in an alternating manner.

In the known gas turbine of FIG. 1, the stator blades 20' are formed as straight blades which are characterized by internal cooling. The trailing edge is cooled by means of the cooling medium which is used, in most cases by means of cooling air, wherein this cooling air is then blown out at least partially through holes which are drilled in the blade trailing edge. As a result of the straight shape of the stator blade and the cooling, which is matched to it, by means of an impingement cooling insert, limitations in efficiency result, however, the overcoming of which would bring advantages in the design of the gas turbine.

SUMMARY

The disclosure is directed to a stator blade for a gas turbine. The stator blade includes a blade airfoil extending in a radial direction between a blade tip and a shroud, with cooling passages extending inside the blade airfoil, through which a cooling medium can flow for cooling the stator blade and can then discharge from the stator blade into a hot gas flow which flows through the turbine. The blade airfoil has a sharply curved shape in space in the radial direction. A plurality of cooling passages, which extend in the radial direction, are arranged inside the blade airfoil, in series, in the hot gas flow. Deflection regions, which are arranged at ends of the blade airfoil, are interconnected so that the cooling medium flows through the cooling passages one after the other, with change of direction. The cooling passages follow a curvature of the blade airfoil in space in the radial direction.

In another aspect, the disclosure is directed to a gas turbine including a stator blade, which includes a blade airfoil extending in a radial direction between a blade tip and a shroud, with cooling passages extending inside the blade airfoil, through which a cooling medium can flow for cooling the stator blade and can then discharge from the stator blade into a hot gas flow which flows through the turbine. The blade airfoil has a sharply curved shape in space in the radial direction. A plurality of cooling passages, which extend in the radial direction, are arranged inside the blade airfoil, in series, in the hot gas flow. Deflection regions, which are arranged at ends of the blade airfoil, are interconnected so that the cooling medium flows through the cooling passages one after the other, with change of direction. The cooling passages follow a curvature of the blade airfoil in space in the radial direction. The gas turbine functions with sequential combustion and has two combustion chambers in series in the flow direction, with a subsequent turbine in each case. The stator blade is arranged in the second turbine.

BRIEF DESCRIPTION OF THE DRAWINGS

The invention shall subsequently be explained in more detail based on exemplary embodiments in conjunction with the drawing. All elements which are not necessary for the direct understanding of the invention have been omitted. Like elements are provided with the same designations in the different figures. The flow direction is indicated by arrows. In the drawing.

DETAILED DESCRIPTION OF THE PREFERRED EMBODIMENTS

Introduction to the Embodiments

Figure 1:
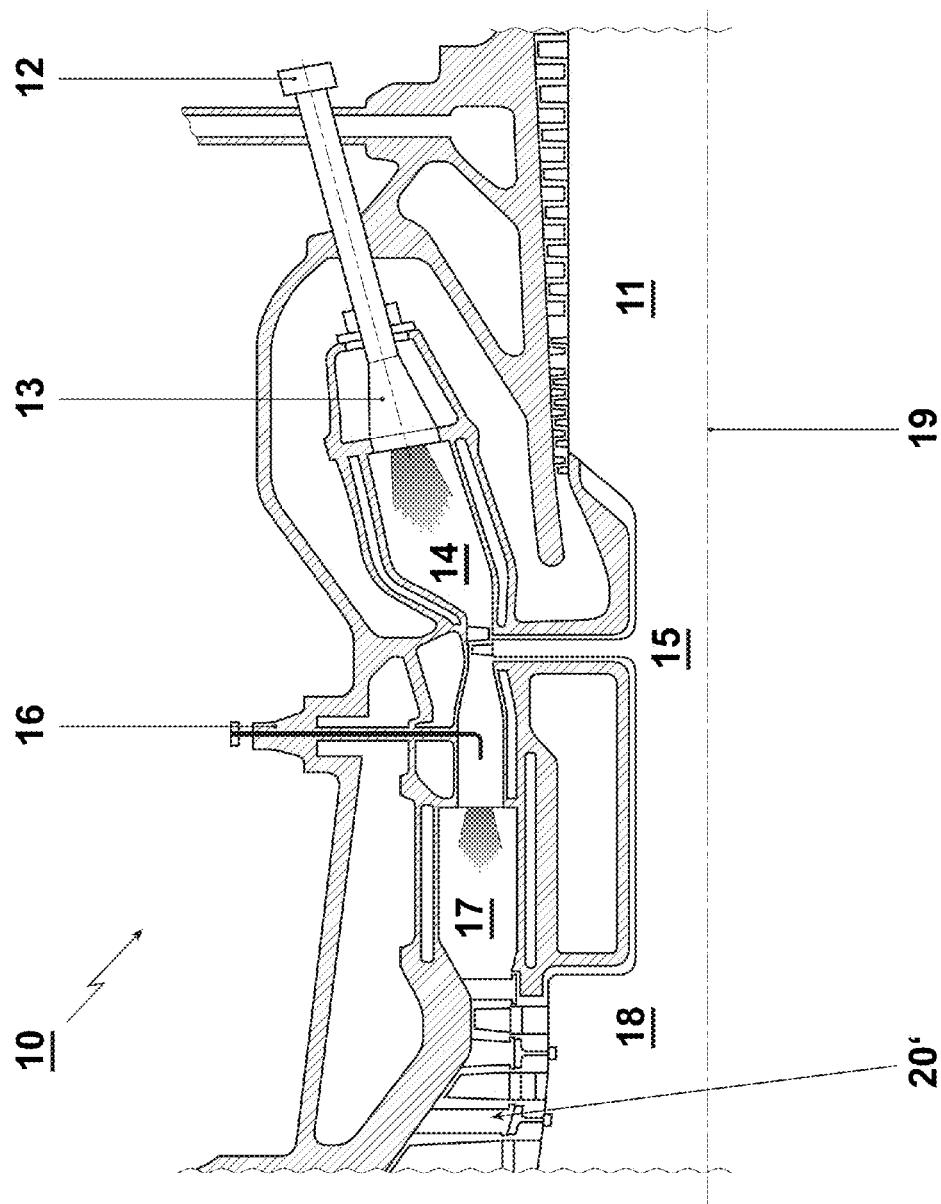
FIG. 1 shows the principle construction of a gas turbine with sequential combustion according to the prior art.

The invention should provide a remedy for the above mentioned limitations. It is therefore the object of the invention to create a stator blade which overcomes the limitations of known stator blades and enables an increase in the efficiency of the gas turbine.

The object is achieved by the entirety of the features of invention. It is preferable that the blade airfoil of the stator blade has a curved shape in space, even sharply curved at times, in the radial direction, that a number of cooling passages, which extend in the radial direction, are arranged in series in the direction of the hot gas flow and are interconnected by deflection regions, which are arranged at the ends of the blade airfoil, so that the cooling medium flows through the cooling passages one after the other, with change of direction, and that the cooling passages follow the curvature of the blade airfoil in space in the radial direction. As a result of the sharply curved shape of the blade airfoil, the interaction with the hot gas flow of the gas turbine is significantly improved. The configuration of the cooling passages, which follows the external shape of the blade airfoil, in this case enables improved cooling of the thermally highly stressed sectors of the stator blade.

One development of the invention is the entry of the first cooling passage, via a cooling air inlet which extends through the shroud, is in communication with the outer space which lies above the shroud, and a throttling element, for throttling the mass flow of cooling medium which flows through the cooling air inlet, is arranged in the region of the cooling air inlet. The entry-side throttling of the cooling medium flow which flows through the blade, by an independent throttling element, enables the precise adjustment of the cooling flow and so avoids unnecessary losses which have a negative effect upon the efficiency.

The throttling element preferably has the form of a plate which is provided with one or more openings, wherein the throttling element closes off the entry of the cooling air inlet, and the throttling element is soldered into the shroud. As a result of this, a simplified adjustability of the cooling flow ensues.

Another development is the end of the first cooling passage is connected to the start of the second cooling passage by means of a first deflection region, and the cross-sectional area at the entry of the second cooling passage is larger than the cross-sectional area at the outlet of the first cooling passage, wherein the ratio of the cross-sectional area at the entry of the second cooling passage to the cross-sectional area at the outlet of the first cooling passage is preferably about 1.6.

According to a further development of the invention, the end of the second cooling passage is connected to the start of the third cooling passage by a second deflection region, wherein a throttling device, for the controlled extraction of cooling medium for the cooling of the shroud and of a part of the blade trailing edge, is provided in the second deflection region, and the cross-sectional area at the entry of the third cooling passage is smaller than the cross-sectional area at the outlet of the second cooling passage. The ratio of the cross-sectional area at the entry of the third cooling passage to the cross-sectional area at the outlet of the second cooling passage in this case is preferably about 0.9.

The throttling device advantageously comprises a plurality of ribs which are oriented transversely to the throughput direction.

For guiding the flow, an arc-shaped deflection element, which extends from the end of the first cooling passage to the start of the second cooling passage, is especially arranged in the first deflection region, wherein the deflection element divides the cross-sectional area at the outlet of the first cooling passage and the cross-sectional area at the entry of the second cooling passage in each case into two sub-areas of about 33% and 66% of the overall area.

Furthermore, for guiding the flow, providing three cooling passages are provided, two arc-shaped deflection elements, which extend between the end of the second cooling passage and the start of the third cooling passage, are advantageously arranged in the second deflection region, wherein the deflection elements divide the cross-sectional area after the middle of the second deflection region into three sub-areas of about 33% of the overall area in each case, and divide the cross-sectional area at the entry of the third cooling passage into three sub-areas of about 36%, 36% and 28% of the overall area.

Another development of the invention is the cross-sectional areas of the three cooling passages halfway up the stator blade are in a ratio of 1:2:1.

According to a further development, the blade airfoil extends between a leading edge and a trailing edge in the direction of the hot gas flow and has a pressure side and a suction side, wherein on the pressure side, in front of the trailing edge, provision is made for a cooling slot which extends parallel to the trailing edge and through which the cooling medium is able to discharge from the third cooling passage over the entire length of the stator blade and is able to cool the trailing edge of the stator blade.

For adjusting the cooling flow through the cooling slot, provision is preferably made in the cooling slot for so-called control elements which are distributed in the longitudinal direction and have at least two different shapes, especially a round shape and a teardrop-like shape, and are arranged in a singly or multiply alternating manner in the longitudinal direction.

Furthermore, a throttling device, for the controlled extraction of cooling medium for the cooling of the shroud, which comprises a plurality of ribs which are oriented transversely to the throughput direction, may be provided between the second deflection region and the cooling slot.

It is furthermore advantageous if the third cooling passage has a cross-sectional area which reduces in the radial direction from the outside inwards, and if the rate of reduction of the cross-sectional area from the outside inwards is lower over the first 70% of the passage length than over the last 30%.

Turbulator ribs may also be arranged in the cooling passages, which in particular are arranged in the cooling passages obliquely to the flow direction, for improving the cooling effect.

The first cooling passage preferably has a triangular cross section which tapers towards the leading edge, the second cooling passage preferably has a rectangular cross section, and the third cooling passage preferably has a triangular cross section which tapers towards the trailing edge, wherein the turbulator ribs in the first and third cooling passages become flatter towards the leading edge or trailing edge, as the case may be, and the turbulator ribs in the second cooling passage have a constant height.

Finally, cams, which are distributed over the surface, may be provided in the cooling slot for improving the transfer of heat.

The stator blade according to the invention can be advantageously used in a gas turbine, wherein the gas turbine is equipped with sequential combustion and has two combustion chambers in series in the flow direction, with a subsequent turbine in each case, and the stator blade according to the invention is preferably arranged in the second turbine.

The second turbine is especially designed so that a plurality of rows of stator blades are provided in series, wherein the stator blade according to the invention is arranged in a middle stator blade row in the axial flow direction.

DETAILED DESCRIPTION

Figure 2:
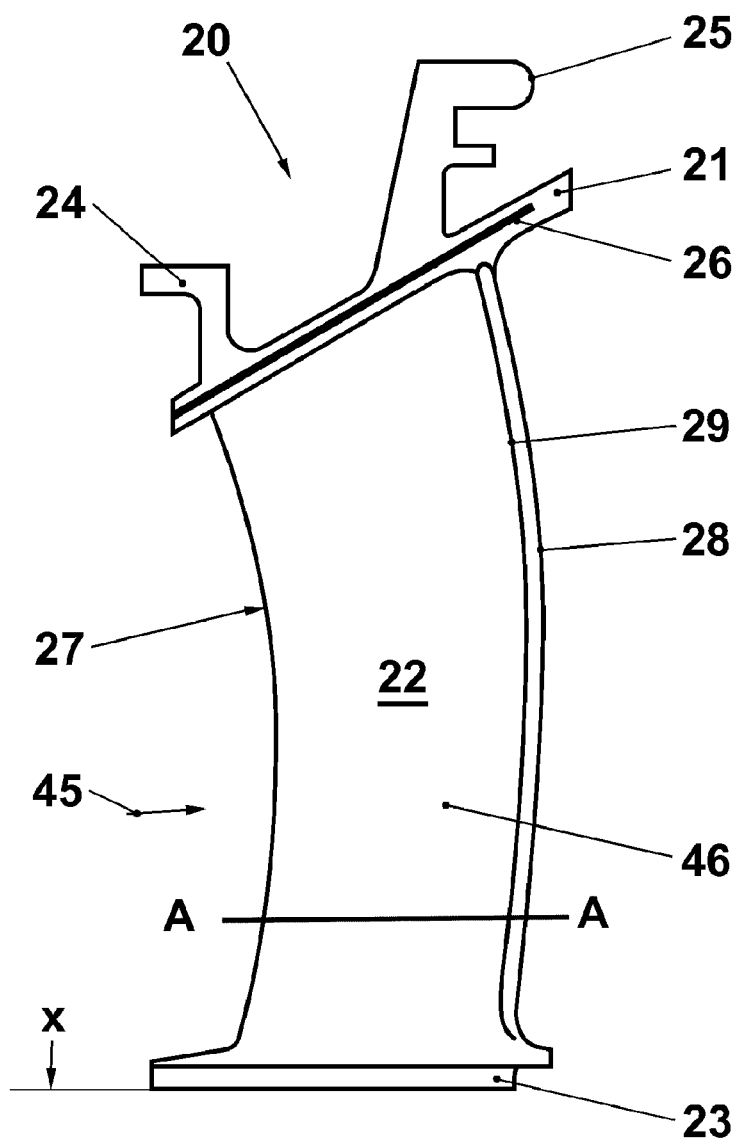
FIG. 2 shows in a side view a stator blade of a gas turbine with sequential combustion in accordance with FIG. 1 according to a preferred exemplary embodiment of the invention.
Figure 2A:
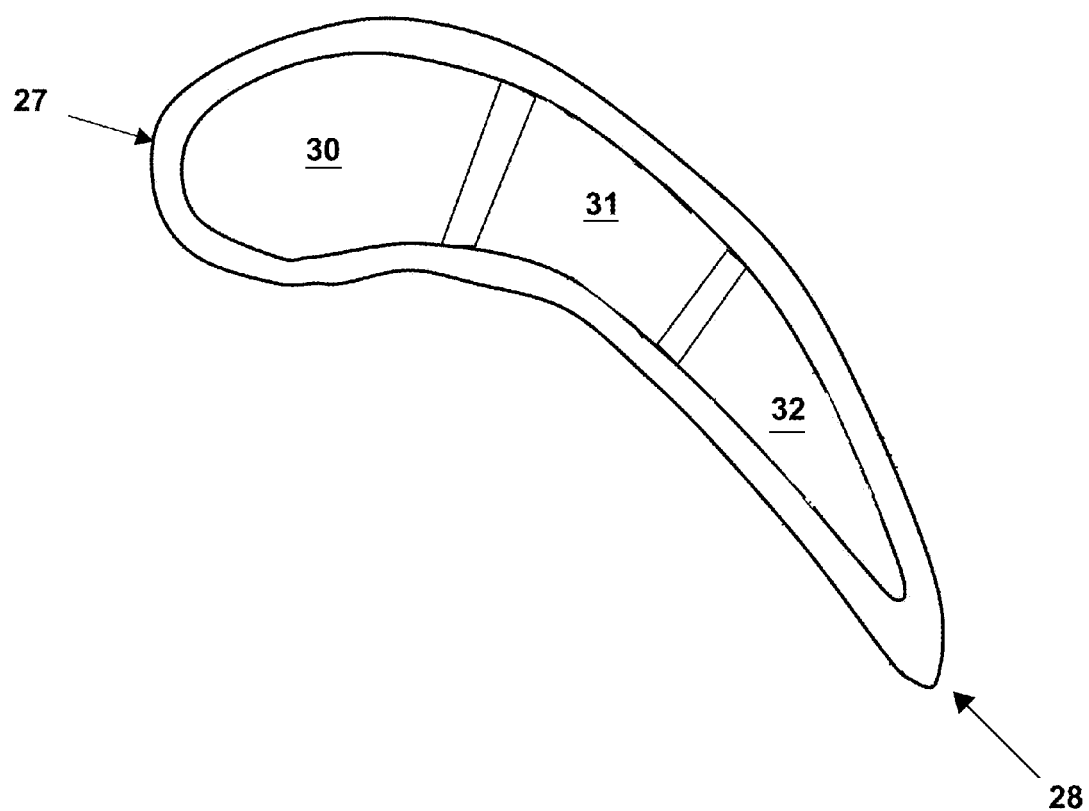
FIG. 2A shows a lateral section through line A-A of the stator blade in FIG. 2.

In FIG. 2, in a side external view, a stator blade is shown, which in this case is specified according to a preferred, but not exclusive, exemplary embodiment of the invention for the low-pressure turbine of a gas turbine, wherein the gas turbine is operated with sequential combustion. The stator blade 20 comprises a blade airfoil 22 which at times is sharply curved in space and which extends in the longitudinal direction (in the radial direction of the gas turbine) between a blade tip 23 and a shroud 21 and extends from a leading edge 27 to a trailing edge 28 in the direction of the hot gas flow 45. Between the two edges 27 and 28, the blade airfoil 22 is bounded on the outside by means of a pressure side (facing the viewer in FIG. 2) and an (opposite) suction side. A cooling slot 29, which extends parallel to the trailing edge 28, is arranged on the pressure side just in front of the trailing edge 28, by means of which cooling air discharges outwards from the inside of the blade and cools the blade region between cooling slot 29 and trailing edge 28, and the trailing edge 28 itself. The stator blade 20 is fastened on the turbine casing by means of the hook-like fastening elements 24 and 25 which are formed on the upper side of the shroud 21, whereas with the blade tip 23 the stator blade abuts against the rotor with sealing effect. Sealing slots 26, which accommodate strip seals for sealing the gaps between adjacent stator blades, are arranged in the side faces of the shroud 21.

Figure 3:
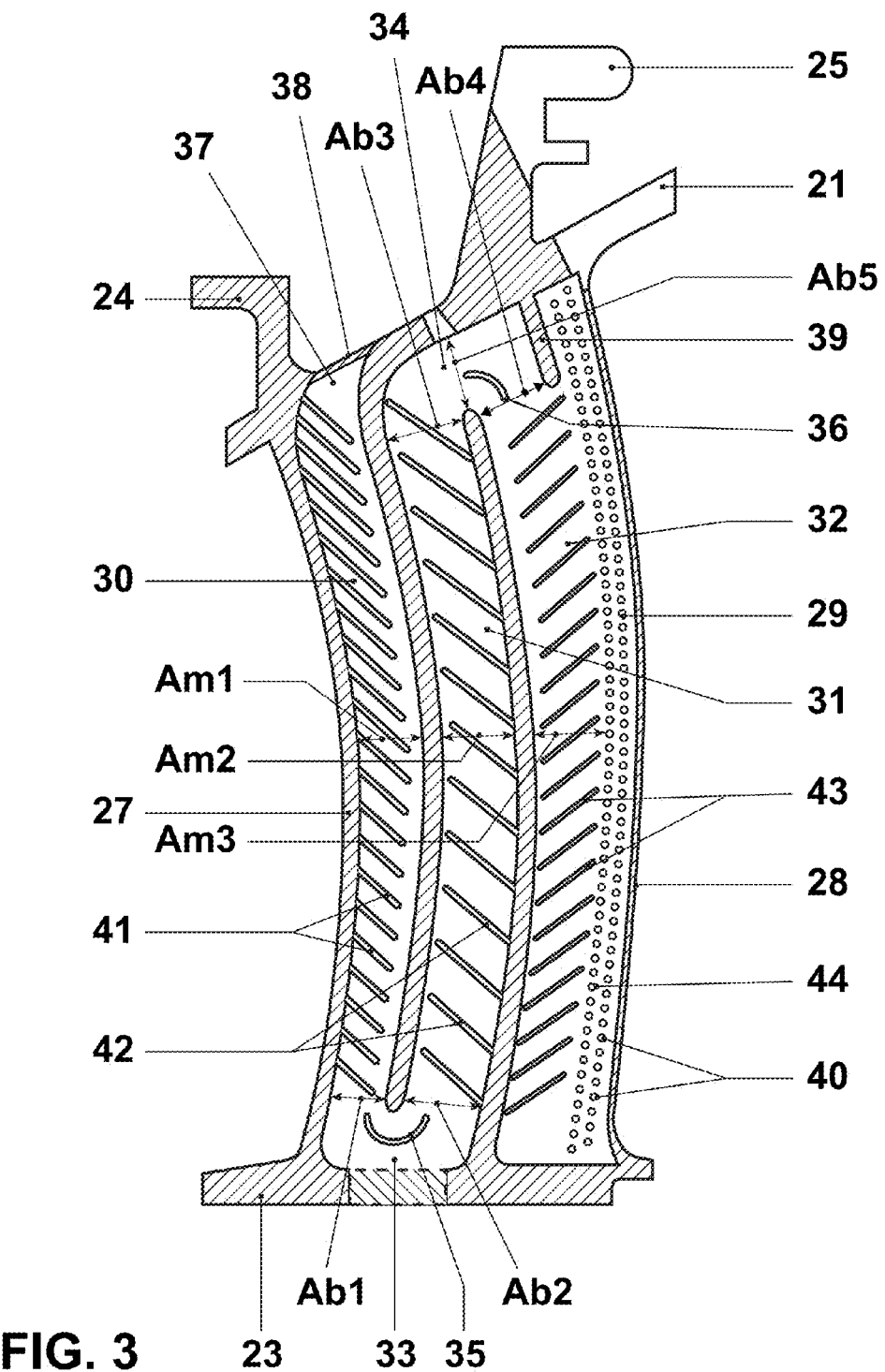
FIG. 3 shows a longitudinal section through the stator blade according to FIG. 2.

The inner construction of the stator blade 20 is shown in FIG. 3. The blade airfoil is traversed by three cooling passages 30, 31 and 32 in the longitudinal direction, which follow the curvature of the blade airfoil in space and are arranged in series in the direction of the hot gas flow 45 and are interconnected by means of deflection regions 33, 34 which are arranged at the ends of the blade airfoil so that the cooling medium flows through the cooling passages 30, 31, 32 one after the other with change of direction. The end of the first cooling passage 30 is connected to the start of the second cooling passage 31 by means of the first deflection region 33. The cross-sectional area Ab2 at the entry of the second cooling passage 31 in this case is larger than the cross-sectional area Ab1 at the outlet of the first cooling passage 30. The ratio of the cross-sectional area Ab2 at the entry of the second cooling passage 31 to the cross-sectional area Ab1 at the outlet of the first cooling passage 30 is preferably about 1.6.

The end of the second cooling passage 31 is connected to the start of the third cooling passage 32 by means of the second deflection region 34. The cross-sectional area Ab4 at the entry of the third cooling passage 32 in this case is smaller than the cross-sectional area Ab3 at the outlet of the second cooling passage 31. The ratio of the cross-sectional area Ab4 at the entry of the third cooling passage 32 to the cross-sectional area Ab3 at the outlet of the second cooling passage 31 is preferably about 0.9. This special ratio is selected in order to compensate the reduction of the cooling air flow from the second to the third cooling passage. A throttling device 39, for the controlled extraction of cooling medium for the cooling of the outer platform 21 and of a part of the trailing edge 28, is provided between the second deflection region 34 and the cooling slot 29, which throttling slot in the exemplary embodiment comprises a plurality of ribs which are oriented transversely to the throughput direction. By means of the cooling slot 29, the cooling medium in this case is able to discharge from the third cooling passage 32 over the entire length of the stator blade 20 and to cool the trailing edge 28 of the stator blade 20.

For guiding the flow in the series-connected cooling passages 30, 31, 32 an arc-shaped deflection element 35, which extends from the end of the first cooling passage 30 to the start of the second cooling passage 31, is arranged in the first deflection region 33. The deflection element 35 is positioned in the first deflection region 33 so that it divides the cross-sectional area Ab1 at the outlet of the first cooling passage 30 and the cross-sectional area Ab2 at the entry of the second cooling passage 31 in each case into two sub-areas of about 33% and 66% of the overall area.

For guiding the flow, two arc-shaped deflection elements 36, which extend approximately parallel between the middle of the second deflection region and the start of the third cooling passage 32, are correspondingly arranged in the second deflection region 34. These deflection elements 36 are arranged in the second deflection region 34 so that they divide the cross-sectional area in the middle of the second deflection region 34 at the outlet of the second cooling passage 31 into three sub-areas of about 33% of the overall area in each case, and divide the cross-sectional area Ab4 at the entry of the third cooling passage 32 into three sub-areas of about 36%, 36% and 28% of the overall area.

The cross-sectional areas Am1, Am2, Am3 of the three cooling passages 30, 31, 32 halfway up (in the middle of) the stator blade 20 are preferably in a ratio of 1:2:1 for reasons of optimized cooling. The third cooling passage 32 has a cross-sectional area which reduces in the radial direction from the outside inwards, wherein the rate of reduction of the cross-sectional area from the outside inwards is lower over the first 70% of the passage length than over the last 30%.

As a result of these dimensioning measures for the cooling passages, optimum cooling of the curved blade according to the invention is achieved.

The entry of the first cooling passage 30 is in communication via a cooling air inlet 37, which extends through the outer platform 21, with the outer space which lies above the outer platform 21. A special throttling element 38, for throttling the mass flow of cooling medium which flows through the cooling air inlet 37, is arranged in the region of the cooling air inlet 37. The throttling element 38 has the form of a plate which is provided with one or more openings. The plate is soldered into the outer platform 21 and closes off the entry of the cooling air inlet 37.

At the other end of the cooling system, blocking elements 40, which are distributed in the longitudinal direction, are arranged in the cooling slot 29 for adjusting the cooling flow through the cooling slot 29. The control elements 40 occur in the figure in two different shapes, specifically in a round configuration and in a teardrop-like configuration, wherein these configurations are not to be understood as being exclusive. The two shapes are arranged in the cooling slot 29 in a singly alternating manner or, if required, also in a multiply alternating manner, wherein the teardrop shapes are oriented in each case towards the local hot gas flow. Cams 44, which are distributed over the surface, are provided in the cooling slot 29 in front of the blocking elements 40 in the flow direction for improving the transfer of heat. In the radial direction, the cams 40 have a constant spacing, whereas the axial spacing alters and is minimal in the middle of the blade, whereas it increases towards the end-side terminating surfaces 21 and 23 of the stator blade. This is consistent with the temperature profile of the hot gas flow 45, which has a maximum in the middle of the blade and decreases towards the end-side terminating surfaces.

Turbulator ribs 41, 42 43 are also arranged in the cooling passages 30, 31, 32 for improving the cooling effect. The turbulator ribs 41, 42, 43 are oriented obliquely to the flow direction in the cooling passages 30, 31, 32.

In conformance with the airfoil profile of the blade, the first cooling passage 30 has a triangular cross section which tapers towards the leading edge 27, the second cooling passage 31 has a rectangular cross section, and the third cooling passage has a triangular cross section which tapers towards the trailing edge 28. Correspondingly, the turbulator ribs 41, 43 in the first and third cooling passages 30, 32 become flatter towards the leading edge 27 or trailing edge 28, as the case may be, whereas the turbulator ribs 42 in the second cooling passage 31 have a constant height.

The stator blade 20, which is optimized according to the invention, is preferably used in a gas turbine with sequential combustion, which has two combustion chambers in series in the flow direction, with a subsequent turbine in each case. The stator blade in this case is arranged in the second turbine which has a plurality of rows of stator blades which are in series in the flow direction, wherein the stator blade is arranged in a middle stator blade row.

LIST OF DESIGNATIONS

10 Gas turbine
11 Compressor
12, 16 Fuel feed
13 EV burner
14, 17 Combustion chamber
15 High-pressure turbine
18 Low-pressure turbine
19 Axis
20, 20' Stator blade
21 Shroud
22 Blade airfoil
23 Blade tip
24, 25 Fastening element (hook-like)
26 Sealing slot
27 Leading edge
28 Trailing edge
29 Cooling slot
30, 31, 32 Cooling passage
33, 34 Deflection region
35, 36 Deflection element
37 Cooling air inlet
38 Throttling element (plate-like)
39 Throttling element (rib-like)
40 Blocking element and/or control element
41, 42, 43 Turbulator rib
44 Cam
45 Hot gas flow
46 Pressure side (blade airfoil)
$Am1, Am2, Am3$ Cross-sectional area (blade middle)
$Ab1, \ldots, Ab5$ Cross-sectional area (deflection region)

What is claimed is:

1. A stator blade for a gas turbine, the stator blade having a blade airfoil extending in a radial direction between a blade tip and a shroud, with cooling passages extending inside the blade airfoil, through which a cooling medium flows for cooling the stator blade and then discharges from the stator blade into a hot gas flow which flows through the turbine, the blade airfoil having a sharply curved shape in space in the radial direction, a plurality of cooling passages, which extend in the radial direction, are arranged inside the blade airfoil, in series, in the hot gas flow direction and deflection regions, which are arranged at ends of the blade airfoil, are interconnected so that the cooling medium flows through the cooling passages one after the other, with change of direction, the cooling passages follow a curvature of the blade airfoil in space in the radial direction, wherein an entry of a first cooling passage, via a cooling air inlet which extends through a shroud, is in communication with an outer space which lies above the shroud, and the first cooling passage is connected to a start of a second cooling passage by a first deflection region, and a cross-sectional area at an entry of the second cooling passage is larger than a cross-sectional area at an outlet of the first cooling passage, and a throttling element, for throttling a mass flow of cooling medium which flows through the cooling air inlet, is arranged in a region of the cooling air inlet, the throttling element having the form of a plate which is provided with at least one opening, the throttling element closes off the entry of the cooling air inlet and is soldered into the shroud, wherein a ratio of the cross-sectional area at the entry of the second cooling passage to the cross-sectional area at the outlet of the first cooling passage is about 1.6 and wherein an end of the second cooling passage is connected to a start of a third cooling passage by a second deflection region, a throttling device, for the controlled extraction of cooling medium for the cooling of an outer platform and of a part of a trailing edge, is provided in the second deflection region, a cross-sectional area at an entry of the third cooling passage is smaller than a cross-sectional area at an outlet of the second cooling passage and cross-sectional areas of the three cooling passages halfway up the stator blade are in a ratio of 1:2:1.

2. The stator blade as claimed in claim 1, wherein inside the blade airfoil there are at least two cooling passages which extend in the radial direction.

3. The stator blade as claimed in claim 1, wherein a ratio of the cross-sectional area at the entry of the third cooling passage to the cross-sectional area at the outlet of the second cooling passage is about 0.9.

4. The stator blade as claimed in claim 1, wherein the throttling device comprises a plurality of ribs which are oriented transversely to a throughput direction.

5. The stator blade as claimed in claim 1, wherein an arc-shaped deflection element, which extends from the end of the first cooling passage to the start of the second cooling passage, is arranged in the first deflection region, the deflection element divides the cross-sectional area at the outlet of the first cooling passage and the cross-sectional area at the entry of the second cooling passage in each case into two sub-areas of about 33% and 66% of the overall area.

6. The stator blade as claimed in claim 1, wherein two arc-shaped deflection elements, which extend between the middle of the second deflection region and the start of the third cooling passage, are arranged in the second deflection region, the deflection elements divide a cross-sectional area of a middle of the second deflection region into three sub-areas of about 33% of the overall area in each case, and divide the cross-sectional area at the entry of the third cooling passage into three sub-areas of about 36%, 36% and 28% of the overall area.

7. The stator blade as claimed in claim 1, wherein the blade airfoil extends from a leading edge to a trailing edge in a flow direction of the hot gas flow, the blade airfoil has a pressure side and a suction side, on the pressure side, in front of the trailing edge, a cooling slot extends parallel to the trailing edge through which the cooling medium is able to discharge from the third cooling passage over the entire length of the stator blade and is able to cool the trailing edge of the stator blade.

8. The stator blade as claimed in claim 7, wherein the cooling slot comprises control elements, distributed in a longitudinal direction thereof, for adjusting cooling medium flow through the cooling slot.

9. The stator blade as claimed in claim 1, wherein the third cooling passage has a cross-sectional area which reduces in the radial direction, outside inwards, and wherein a rate of reduction of the cross-sectional area from the outside inwards is lower over the first 70% of the passage length than over the last 30%.

10. The stator blade as claimed in claim 1, wherein turbulator ribs are arranged in the cooling passages for improving a cooling effect.

11. The stator blade as claimed in claim 10, wherein the turbulator ribs are arranged obliquely to a flow direction in the cooling passages.

12. The stator blade as claimed in claim 10, wherein the first cooling passage has a triangular cross section which tapers towards a leading edge, the second cooling passage has a rectangular cross section, and the third cooling passage has a triangular cross section which tapers towards a trailing edge, and wherein the turbulator ribs in the first and third cooling passages become flatter towards the leading edge or trailing edge, respectively, the turbulator ribs in the second cooling passage having a constant height.

13. The stator blade as claimed in claim 7, wherein the cooling slot comprises cams distributed over a surface of the slot to improve heat transfer.

14. A gas turbine with a stator blade having a blade airfoil extending in a radial direction between a blade tip and a shroud, with cooling passages extending inside the blade airfoil, through which a cooling medium flows for cooling the stator blade and then discharges from the stator blade into a hot gas flow which flows through the turbine, the blade airfoil having a sharply curved shape in space in the radial direction, a plurality of cooling passages, which extend in the radial direction, are arranged inside the blade airfoil, in series, in the hot gas flow direction and deflection regions, which are arranged at ends of the blade airfoil, are interconnected so that the cooling medium flows through the cooling passages one after the other, with change of direction, the cooling passages follow a curvature of the blade airfoil in space in the radial direction, an entry of a first cooling passage, via a cooling air inlet which extends through the shroud, is in communication with an outer space which lies above the shroud, and the first cooling passage is connected to a start of a second cooling passage by a first deflection region, and a cross-sectional area at an entry of the second cooling passage is larger than a cross-sectional area at an outlet of the first cooling passage, and a throttling element, for throttling a mass flow of cooling medium which flows through the cooling air inlet, is arranged in a region of the cooling air inlet, the throttling element having the form of a plate which is provided with at least one opening, the throttling element closes off the entry of the cooling air inlet and is soldered into the shroud, wherein the gas turbine functions with sequential combustion and has two combustion chambers in series in a flow direction, with a subsequent turbine in each case, the stator blade is arranged in the second turbine, wherein a ratio of the cross-sectional area at the entry of the second cooling passage to the cross-sectional area at the outlet of the first cooling passage is about 1.6 and wherein an end of the second cooling passage is connected to a start of a third cooling passage by a second deflection region, a throttling device, for the controlled extraction of cooling medium for the cooling of an outer platform and of a part of a trailing edge, is provided in the second deflection region, a cross-sectional area at an entry of the third cooling passage is smaller than a cross-sectional area at an outlet of the second cooling passage and cross-sectional areas of the three cooling passages halfway up the stator blade are in a ratio of 1:2:1.

15. The gas turbine as claimed in claim 14, wherein the second turbine comprises a plurality of rows of stator blades and rotor blades in series in the flow direction, the stator blade is arranged in a middle stator blade row between two rotor blades.

\* \* \* \* \*